United States Patent
Athavale et al.

(10) Patent No.: US 9,993,733 B2
(45) Date of Patent: Jun. 12, 2018

(54) INFRARED REFLECTIVE DEVICE INTERACTIVE PROJECTION EFFECT SYSTEM

(71) Applicant: Lumo Interactive Inc., Winnipeg (CA)

(72) Inventors: Meghan Jennifer Athavale, Toronto (CA); Chris Iverach-Brereton, Winnipeg (CA); Curtis Wachs, Winnipeg (CA)

(73) Assignee: Lumo Interactive Inc., Winnipeg (CA)

( * ) Notice: Subject to any disclaimer, the term of this patent is extended or adjusted under 35 U.S.C. 154(b) by 409 days.

(21) Appl. No.: 14/327,404

(22) Filed: Jul. 9, 2014

(65) Prior Publication Data

US 2016/0008718 A1 Jan. 14, 2016

(51) Int. Cl.
*A63F 13/65* (2014.01)
*A63F 13/213* (2014.01)
*A63F 13/25* (2014.01)

(52) U.S. Cl.
CPC ............ *A63F 13/65* (2014.09); *A63F 13/213* (2014.09); *A63F 13/25* (2014.09)

(58) Field of Classification Search
CPC ....... A63F 13/25; A63F 13/213; G06F 3/0383
See application file for complete search history.

(56) References Cited

U.S. PATENT DOCUMENTS

| | | | |
|---|---|---|---|
| 5,534,917 A | 7/1996 | Macdougall | |
| 7,259,747 B2 | 8/2007 | Bell | |
| 7,775,883 B2 | 8/2010 | Smoot et al. | |
| 7,809,167 B2 | 10/2010 | Bell | |
| 7,834,846 B1 | 11/2010 | Bell | |
| 8,305,441 B2 | 11/2012 | Boghossian et al. | |
| 8,363,716 B2 | 1/2013 | Kalva et al. | |
| 8,553,103 B1 | 10/2013 | Samadani et al. | |
| 9,241,124 B2 | 1/2016 | Athavale et al. | |
| 2001/0012001 A1 | 8/2001 | Rekimoto et al. | |
| 2003/0133041 A1 | 7/2003 | Curtis et al. | |
| 2004/0102247 A1* | 5/2004 | Smoot ..................... A63F 13/00 463/36 |

(Continued)

FOREIGN PATENT DOCUMENTS

| CN | 105359546 A | 2/2016 |
|---|---|---|
| EP | 2341700 A1 | 7/2011 |

(Continued)

OTHER PUBLICATIONS

"U.S. Appl. No. 13/336,363, Advisory Action dated Mar. 20, 2014", 6 pgs.

(Continued)

*Primary Examiner* — James S McClellan
*Assistant Examiner* — Kevin Carter
(74) *Attorney, Agent, or Firm* — Schwegman Lundberg & Woessner, P.A.

(57) ABSTRACT

Some embodiments herein include systems, methods, and software for IR object identification and motion detection. Consumers may project an interactive projection surface on the wall or floor of any room, and when IR object motion is detected, the interactive projection may update in response to the motion. A newly introduced IR object may be identified, and an effect specific to the IR object may be projected into the IR object.

20 Claims, 6 Drawing Sheets

(56) References Cited

U.S. PATENT DOCUMENTS

| | | | |
|---|---|---|---|
| 2005/0202867 A1* | 9/2005 | Cok | A63F 13/10 463/30 |
| 2005/0277071 A1* | 12/2005 | Yee | G06F 3/0425 430/396 |
| 2006/0092170 A1* | 5/2006 | Bathiche | A63F 13/02 345/589 |
| 2007/0291233 A1 | 12/2007 | Culbertson et al. | |
| 2008/0028325 A1 | 1/2008 | Ferren et al. | |
| 2008/0048880 A1* | 2/2008 | Strickland | G06F 3/041 340/815.4 |
| 2008/0062123 A1 | 3/2008 | Bell | |
| 2008/0143975 A1 | 6/2008 | Dennard et al. | |
| 2008/0309801 A1 | 12/2008 | Cuccias | |
| 2009/0278937 A1 | 11/2009 | Botchen et al. | |
| 2010/0066675 A1* | 3/2010 | Wilson | G03B 29/00 345/158 |
| 2010/0103385 A1 | 4/2010 | Kubota | |
| 2011/0234896 A1 | 9/2011 | Ivashin et al. | |
| 2011/0242060 A1* | 10/2011 | McGibney | G06F 3/03545 345/179 |
| 2011/0288964 A1 | 11/2011 | Linder et al. | |
| 2012/0038542 A1 | 2/2012 | Miyashita et al. | |
| 2012/0098865 A1 | 4/2012 | Takano et al. | |
| 2012/0239174 A1* | 9/2012 | Shotton | G06K 9/00362 700/93 |
| 2012/0320157 A1 | 12/2012 | Junuzovic et al. | |
| 2013/0086533 A1 | 4/2013 | Stienstra | |
| 2013/0111549 A1 | 5/2013 | Sowatskey et al. | |
| 2013/0162518 A1 | 6/2013 | Athavale et al. | |
| 2013/0222427 A1 | 8/2013 | Heo et al. | |
| 2014/0327610 A1 | 11/2014 | Athavale et al. | |
| 2015/0054963 A1 | 2/2015 | Athavale et al. | |
| 2015/0123899 A1* | 5/2015 | Taylor | G06F 3/0425 345/157 |
| 2017/0097738 A1 | 4/2017 | Athavale | |

FOREIGN PATENT DOCUMENTS

| | | |
|---|---|---|
| EP | 2428881 A2 | 3/2012 |
| EP | 2525386 A1 | 11/2012 |
| IN | 1029DELNP2015 A | 4/2016 |
| KR | 101359011 B1 | 2/2014 |
| WO | WO-2006015236 A2 | 2/2006 |
| WO | WO-2008052280 A1 | 5/2008 |
| WO | WO-2014176682 A1 | 11/2014 |
| WO | WO-2015036852 A2 | 3/2015 |
| WO | WO-2015036852 A3 | 3/2015 |
| WO | WO-2015175967 A1 | 11/2015 |
| WO | WO-2016007790 A1 | 1/2016 |

OTHER PUBLICATIONS

"U.S. Appl. No. 13/336,363, Examiner Interview Summary dated Jul. 16, 2014", 3 pgs.
"U.S. Appl. No. 13/336,363, Final Office Action dated Jan. 6, 2014", 18 pgs.
"U.S. Appl. No. 13/336,363, Final Office Action dated Oct. 22, 2014", 20 pgs.
"U.S. Appl. No. 13/336,363, Non Final Office Action dated Jun. 19, 2014", 18 pgs.
"U.S. Appl. No. 13/336,363, Non Final Office Action dated Sep. 11, 2013", 15 pgs.
"U.S. Appl. No. 13/336,363, Response filed Mar. 6, 2014 to Final Office Action dated Jan. 6, 2014", 11 pgs.
"U.S. Appl. No. 13/336,363, Response filed Sep. 19, 2014 to Non Final Office Action dated Jun. 19, 2014", 12 pgs.
"U.S. Appl. No. 13/336,363, Response filed Dec. 10, 2013 to Non Final Office Action dated Sep. 11, 2013", 10 pgs.
"International Application Serial No. PCT/CA2014/000394, International Search Report dated Aug. 7, 2014", 3 pgs.
"International Application Serial No. PCT/CA2014/000394, Written Opinion dated Aug. 7, 2014", 5 pgs.

U.S. Appl. No. 14/267,410, filed May 1, 2014, Content Generation for Interactive Video Projection Systems.
U.S. Appl. No. 14/446,112, filed Aug. 22, 2014, Interactive Projection Effect and Entertainment System.
U.S. Appl. No. 13/336,363, filed Dec. 23, 2011, Interactive Video System.
"U.S. Appl. No. 13/336,363, Advisory Action dated Jan. 16, 2015", 2 pgs.
"U.S. Appl. No. 13/336,363, Examiner Interview Summary dated Mar. 6, 2015", 3 pgs.
"U.S. Appl. No. 13/336,363, Non Final Office Action dated May 21, 2015", 22 pgs
"U.S. Appl. No. 13/336,363, Response filed Mar. 23, 2015 to Final Office Action dated Oct. 22, 2014", 13 pgs.
"U.S. Appl. No. 13/336,363, Response filed Dec. 22, 2014 to Final Office Action dated Oct. 2, 2014", 12 pgs.
"U.S. Appl. No. 14/267,410, Notice of Allowance dated Aug. 10, 2015", 10 pgs.
"International Application Serial No. PCT/IB2014/001838, International Search Report dated May 18, 2015", 2 pgs.
"International Application Serial No. PCT/IB2014/001838, Written Opinion dated May 18, 2015", 12 pgs.
"U.S. Appl. No. 14/466,112, Final Office Action dated Nov. 17, 2016", 25 pgs.
"International Application Serial No. PCT/US2015/031133, International Preliminary Report on Patentability dated Dec. 1, 2016", 6 pgs.
"International Application Serial No. PCT/US2015/039814, International Preliminary Report on Patentability dated Jan. 19, 2017", 6 pgs.
"U.S. Appl. No. 14/466,112, Examiner Interview Summary dated Mar. 20, 2017", 3 pgs.
"U.S. Appl. No. 15/311,613, Non Final Office Action dated Sep. 28, 2017", 13 pgs.
"European Application Serial No. 14792034.2, Response filed May 2, 2017 to Extended European Search Report dated Oct. 7, 2016", 53 pgs.
U.S. Appl. No. 15/311,613, filed Nov. 16, 2016, Mobile Communication Device Interactive Projection Effect System.
"U.S. Appl. No. 13/336,363, Final Office Action dated Sep. 24, 2015", 21 pgs.
"U.S. Appl. No. 13/336,363, Response filed Aug. 21, 2015 to Non Final Office Action dated May 21, 2015", 12 pgs.
"U.S. Appl. No. 14/267,410, Notice of Allowance dated Sep. 14, 2015", 5 pgs.
"U.S. Appl. No. 14/267,410, Notice of Allowance dated Dec. 3, 2015", 5 pgs.
"U.S. Appl. No. 14/466,112, Examiner Interview Summary dated Sep. 9, 2016", 3 pgs.
"U.S. Appl. No. 14/466,112, Non Final Office Action dated May 20, 2016", 25 pgs.
"U.S. Appl. No. 14/466,112, Response filed Sep. 20, 2016 to Non-Final Office Action dated May 20, 2016", 11 pgs.
"Application Serial No. PCT/CA2014/000394, International Preliminary Report on Patentability dated Nov. 12, 2015", 7 pgs.
"European Application Serial No. 14792034.2, Extended European Search Report dated Oct. 7, 2016", 10 pgs.
"European Application Serial No. 14792034.2, Response filed Jun. 17, 2016 to Office Action dated Dec. 11, 2015", 9 pgs.
"International Application Serial No. PCT/US2015/031133, International Search Report dated Sep. 3, 2015", 2 pgs.
"International Application Serial No. PCT/US2015/031133, Written Opinion dated Sep. 3, 2015", 4 pgs.
"International Application Serial No. PCT/US2015/039814, International Search Report dated Nov. 19, 2015", 2 pgs.
"International Application Serial No. PCT/US2015/039814, Written Opinion dated Nov. 19, 2015", 4 pgs.
"International Application Serial No. PCT/IB2014/001838, International Preliminary Report on Patentability dated Mar. 3, 2016", 9 pgs.
"International Serial No. PCT/CA2014/000394, Notification Concerning Transmittal of Copy of International Preliminar Report on Patentability—dated Nov. 12, 2015", 1 pg.

(56) References Cited

OTHER PUBLICATIONS

"International Serial No. PCT/CA2014/000394, International Preliminary Report on Patentability dated Nov. 3, 2015", 6 pgs.

* cited by examiner

INFRARED REFLECTIVE DEVICE INTERACTIVE PROJECTION EFFECT SYSTEM

FIELD

Embodiments herein relate to an infrared (IR) reflective interactive projection effect and video entertainment system. Some embodiments may include a detection of motion of an IR object and projection of an interactive environment, where the interactive environment is responsive to the detected motion of an IR object. Some embodiments may include identification of a specific IR object and, based on the type of device detected, projection of an interactive environment onto the IR object. Interactive video applications or additional content may be purchased or obtained through a software portal on the mobile device, on a website, a kiosk, or other location. Additional embodiments include content that may be included with other purchased content, such as may be included with the purchase of a music album, eBook, or other electronic media. In some other embodiments, promotional or marketing material may include one or more of links, scannable barcodes, codes, and the like that may be utilized to obtain content.

BACKGROUND

Interactive display surfaces are used in various forms for entertainment, promotion, education, and the like. A typical interactive display surface generally comprises a graphical display such as a video screen to display a graphical image or a surface onto which the graphical image may be projected for display to users within an adjacent environment, together with a system for identifying or detecting motion of objects or users within the adjacent environment. The object-identifying or motion-detecting system typically relies on a suitable camera directed towards the adjacent environment. An object-identifying or motion-detecting algorithm analyzes data captured by the camera to identify an object or determine what type of motion has occurred. The graphical image can then be varied according to the object identified or various characteristics of the detected motion. For example, a projected object within the graphical image may be displaced or varied in size, color, or configuration, etc. according to the location or amount of motion detected. However, separating the motion of physical objects from motion of projected objects may be complex and prone to errors.

BRIEF DESCRIPTION OF THE DRAWINGS

In the drawings, like characters of reference indicate corresponding parts in the different figures.

DETAILED DESCRIPTION

Some embodiments herein include systems, methods, and software for IR object identification and motion detection. Consumers may project an interactive image on the wall or floor of any room, or may display the interactive image on a television screen or computer monitor. The IR object may reflect or generate an IR signature that may be detected by an IR camera. When IR object motion is detected, the interactive projection may update in response to the motion. When an IR object is newly introduced into a scene, the type or location of the IR object may be identified, and an effect specific to the IR object or location may be projected into the IR object.

Figure 1:
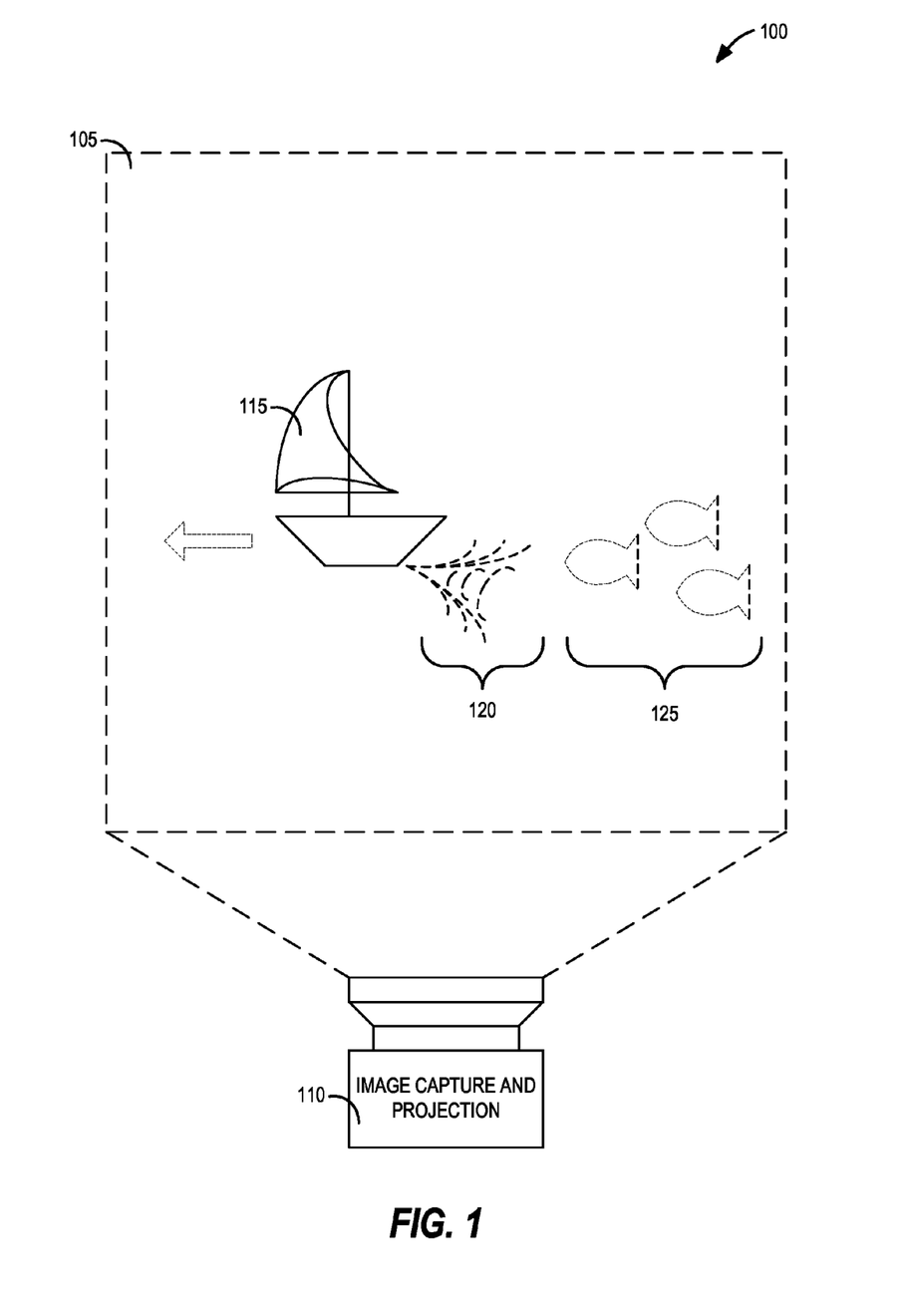
FIG. 1 is a representation of an IR object motion detection and projected effect and entertainment system, according to an embodiment.

FIG. 1 is a representation of an IR object motion detection and projected effect and entertainment system 100, according to an embodiment. The system may include a target surface 105. A projection and image capture device 110 (e.g., camera, image sensor) may be used to capture images or project images onto the target surface 105. The projection and image capture device 110 may capture an image of an IR object 115 (e.g., IR-reflective, IR-generating) on the target surface 105, such as a sailboat. The projection and image capture device 110 may project and capture images from an area defined by the target surface 105, or may use overlapping or mutually exclusive areas for projection or detection of images or objects.

The IR object 115 may be formed from or coated with a material that reflects IR light. The IR object 115 may alternatively generate an IR light or pattern, such as using one or more internal IR LEDs. The IR object may be a self-supporting object or may be a user-supported object. For example, the object may be IR-reflective rings that can be worn on the user's fingers to detect finger motion. The IR object 115 may reflect or project a unique IR signature (e.g., IR pattern, fiducial marker, fiducial) to identify various spatial characteristics of the IR object 115, including size, location, motion, orientation, distance from projection and image capture device 110, or other spatial characteristics.

When the projection and image capture device 110 detects that the IR object 115 has moved, the projection and image capture device 110 may project a temporary effect onto the target surface 105, such as a temporary boat wake 120 following the sailboat. The projection and image capture device 110 may also update the display of a permanent object in response to the object motion, such as updating the motion of a school of fish 125 to follow the sailboat. The projection and image capture device 110 may include evaluating or predicting motion. For example, the path of the sailboat may be predicted, and an island may be projected onto the edge of the target surface 105 to encourage the user to keep the sailboat within the target surface 105.

The projection and image capture device 110 may capture an image using visible light or IR light. The projection and image capture device 110 may project IR light onto the target surface 105, and may capture an image of the reflected IR light. The projected IR light may include flooding the target surface 105 with IR light of a predetermined intensity, or it may include projecting an IR grid or other pattern onto the target surface 105. In an embodiment, a conventional CMOS camera may be used to capture an IR image by removing any IR filter and adding a visible light filter. By reducing visible light and capturing IR light, the projection and image capture device 110 can separate the movement of the IR object 115 from movement within the projected effect. For example, if an IR-reflective sailboat and a projected sailboat are on the target surface 105, the use of IR may enable detection of the IR-reflective sailboat while reducing the likelihood of a false detection of the projected sailboat. The projection and image capture device 110 may adjust projected or detected LED light according to detected ambient IR light. For example, a natural IR light source such as the sun or a candle acts as "light noise," and can interfere with detection of an IR signature. The level of ambient IR light may be detected by a dedicated IR detector, such as an IR-sensitive photoresistor. The ambient IR level may be detected by an image capture device, where the image capture device may include an IR light or visible light filter, or where the image capture device may include an RGBIR sensor (interleaved red, green, blue, and IR sensors).

Figure 2:
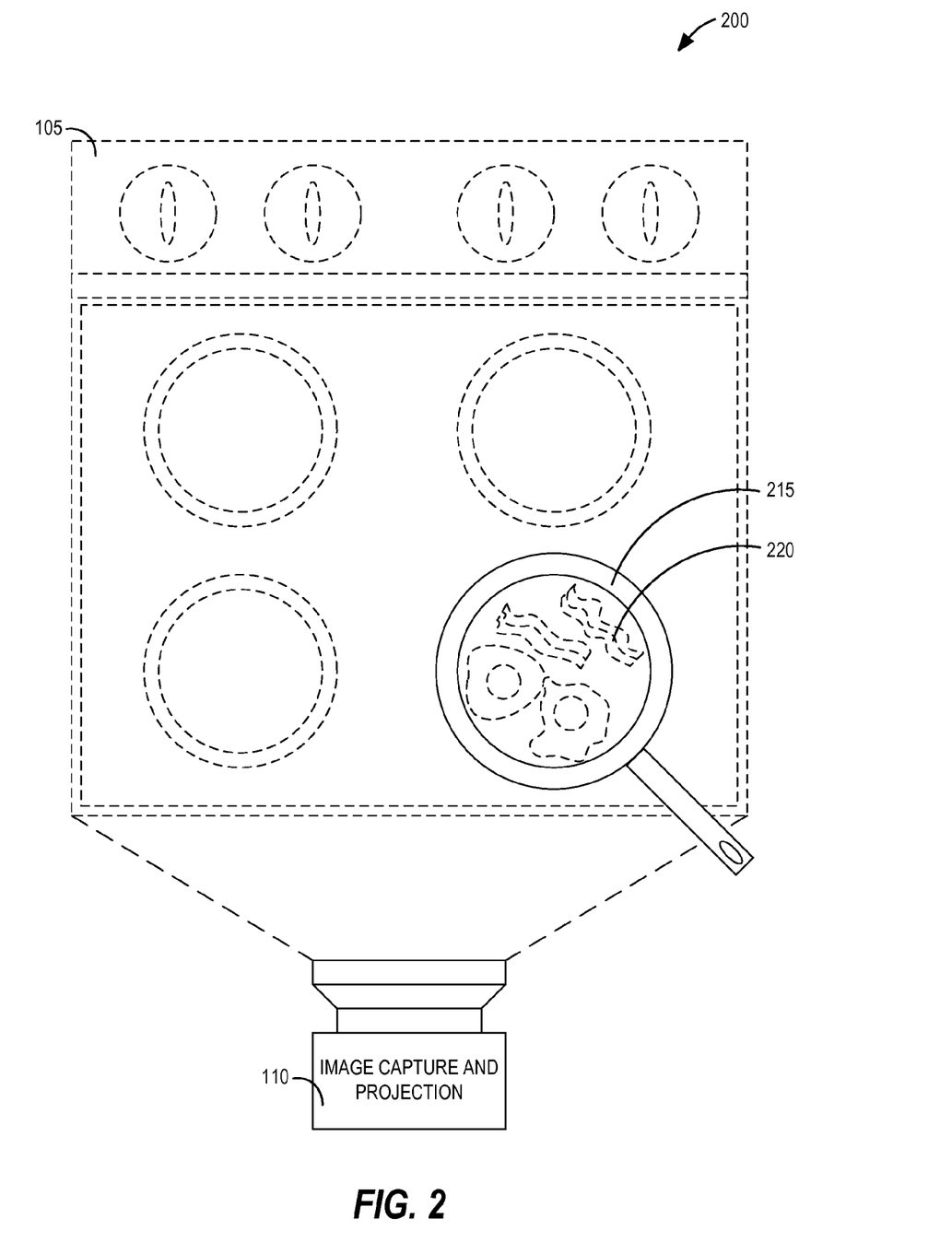
FIG. 2 is a representation of an IR object identification and projected effect and entertainment system, according to an embodiment.

FIG. 2 is a representation of an IR object identification and projected effect and entertainment system 200, according to an embodiment. The system may include a target surface 105. A projection and image capture device 110 may be used to capture and project images onto the target surface 105, such as projecting an oven range. The projection and image capture device 110 may capture an image of an IR object 215 on the target surface 105, such as a frying pan. The IR object 215 may be formed from or coated with a material that reflects IR light. The IR object 115 may also generate an IR light or pattern, such as using one or more internal IR LEDs. When the IR object 115 is placed partially or wholly within the target surface 105, the projection and image capture device 110 may identify the IR object 215. Based on identification of the IR object 215, the projection and image capture device 110 may project a device-specific image 220 onto the IR object 115, such as bacon and eggs. Motion of the IR object 215 may also be detected, and the position of the device-specific image 220 may be updated to correspond to the motion or updated location of the IR object 215.

The identification of the IR object 215 may also be used to determine interaction with a device-specific image 220 projected onto the target surface 105. For example, if the IR object 115 is a toy knife, then bringing the toy knife in proximity with a projected carrot may result in the projected carrot appearing to be cut. The interaction may be predetermined, such as a projected carrot being halved, or the interaction may be dynamic, such as a projected carrot being cut into lengths depending on the relative locations of the knife and carrot. The IR object 215 may include a user-variable IR signature, which may be used to determine interaction with a device-specific image 220. For example, if the IR object 115 is a pair of tongs, then a projected ball may remain stationary until the tongs are brought in proximity with and closed around the ball.

The projection and image capture device 110 may adjust various projection or capture settings through hardware or software to improve performance. For example, the projection and image capture device 110 may adjust absolute or variable IR light intensity, IR pulse power, IR pattern, focal pattern, diffuser pattern, frames per second (FPS) capture rate of camera, sensed or software-determined ambient IR, shutter speed, contrast, gain, f-stop, or variable distance to motion source. The projection and image capture device 110 may include various automated software image-processing features, such as high-dynamic range (HDR) mode. HDR mode may include capturing and combining multiple images, where each image may correspond to a unique set of protected IR light and camera gain and exposure settings.

Figure 3:
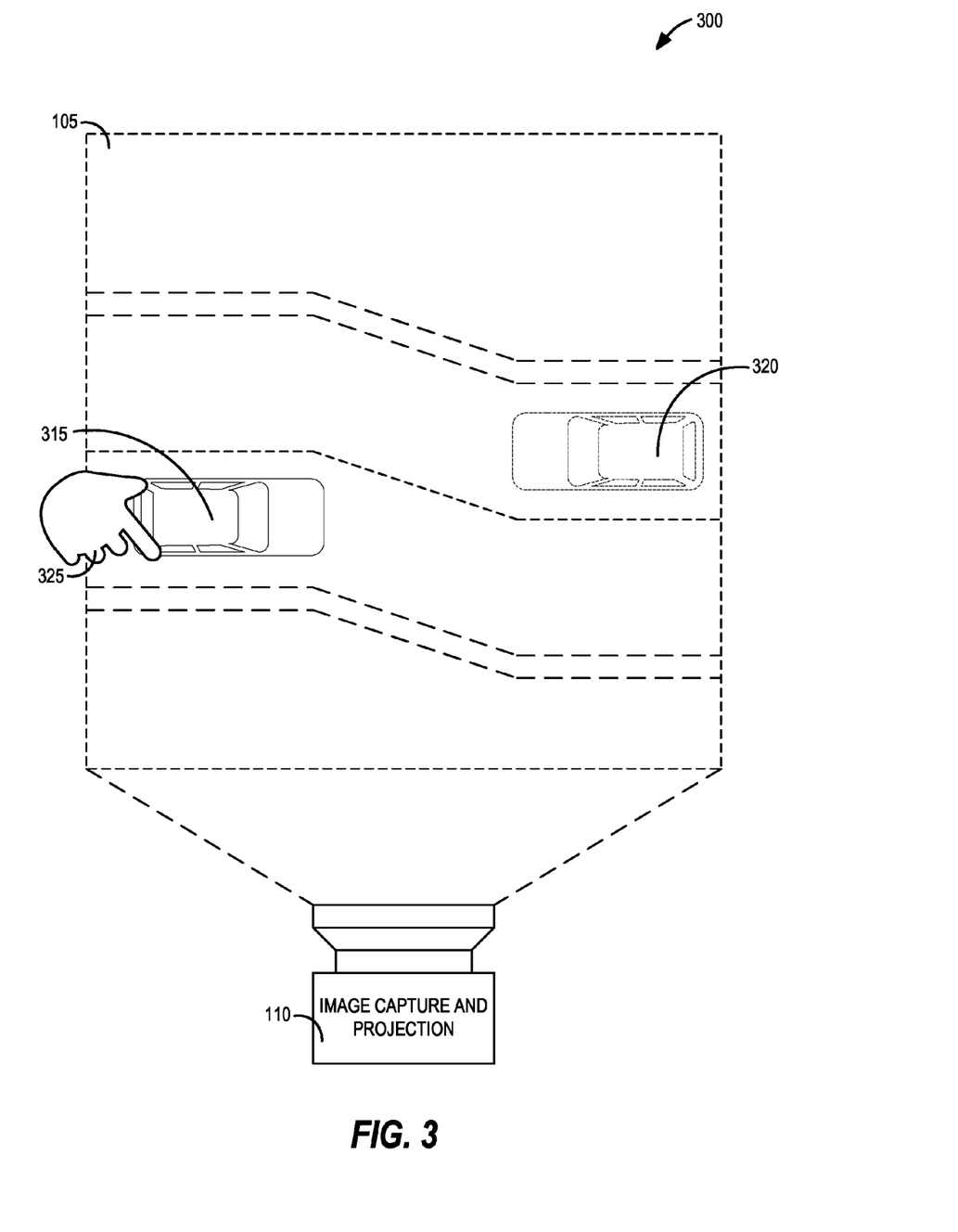
FIG. 3 is a representation of a first IR object location identification and interactive projected effect, according to an embodiment.

FIG. 3 is a representation of a first IR object location identification and interactive projected effect 300, according to an embodiment. The system may include a target surface 105, and a projection and image capture device 110 may capture and project images onto the target surface 105. The projection and image capture device 110 may capture an image of an IR object 315 on the target surface 105, such as a toy car. The IR object 315 may be formed from or coated with a material that reflects IR light. The IR object 315 may also generate an IR light or pattern, such as using two internal IR LEDs as toy car headlights. When the IR object 315 is placed partially or wholly within the target surface 105, the projection and image capture device 110 may identify the IR object 315. Based on identification of the IR object 315, the projection and image capture device 110 may project a device-specific image 320 onto the IR object 115, such as a car in oncoming traffic. The device-specific image 320 may be updated to conform to a static location of the IR object 315, such as the road curving to keep the toy car within a lane. The IR object may be moved by a hand 325 or by another object, and the device-specific image 320 may be updated according to the motion or the updated location of the IR object 315. The use of motion may enable the projected effect to respond more quickly to user interaction, such as using velocity, acceleration, or jerk to predict where the IR object will stop moving. For example, by predicting the location where the toy car will stop moving, the system may project an object in the predicted path of a toy car.

Figure 4:
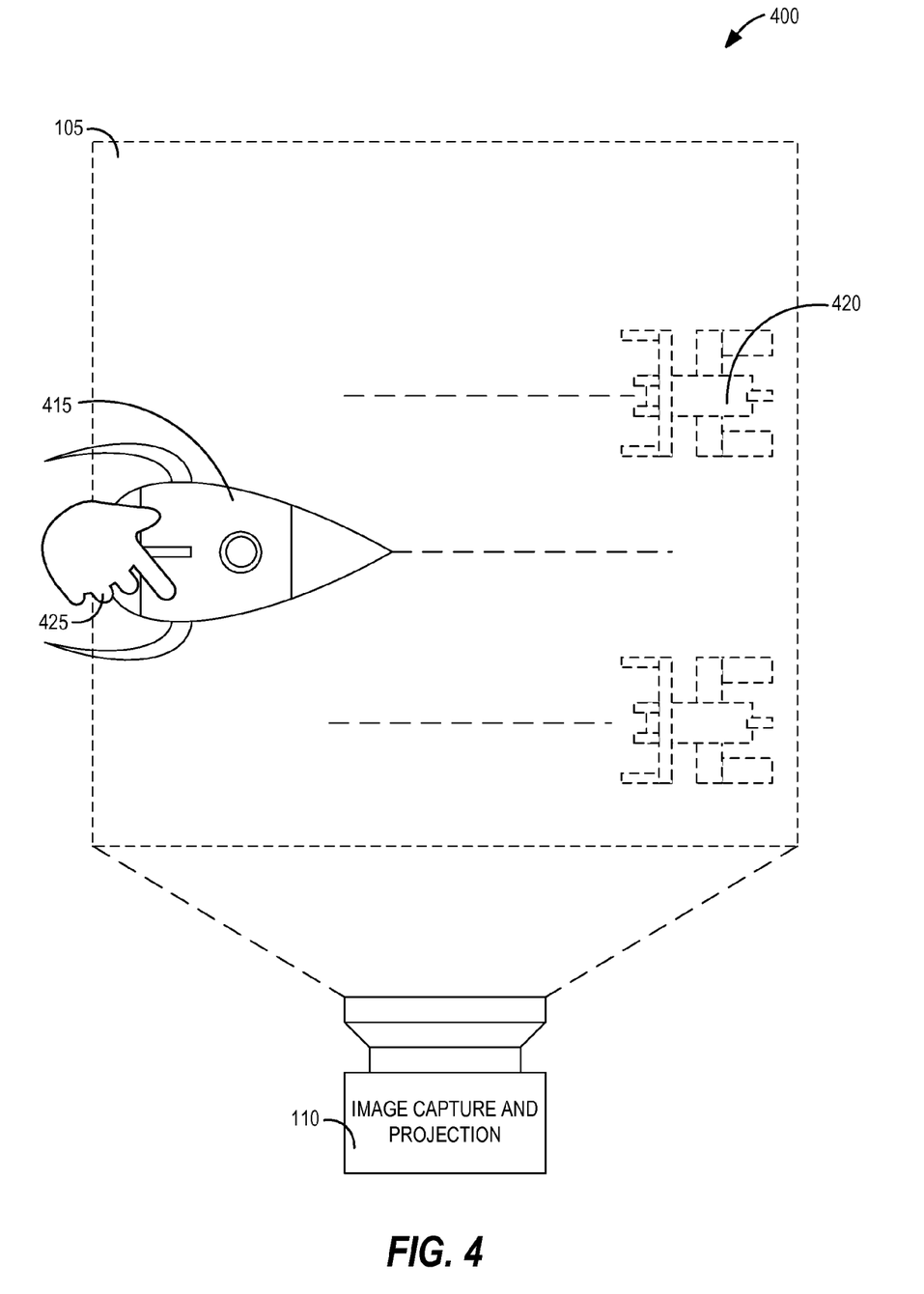
FIG. 4 is a representation of a second IR object location identification and interactive projected effect, according to an embodiment.

FIG. 4 is a representation of a second IR object location identification and interactive projected effect 400, according to an embodiment. The system may include a target surface 105, and a projection and image capture device 110 may capture and project images onto the target surface 105. The projection and image capture device 110 may capture an image of an IR object 415 on the target surface 105, such as a toy spaceship. The IR object 415 may be formed from or coated with a material that reflects IR light. The IR object 315 may also generate an IR light or pattern, such as using one or more internal IR LEDs as aviation or spacecraft navigation lights. When the IR object 415 is placed partially or wholly within the target surface 105, the projection and image capture device 110 may identify the IR object 415. Based on identification of the IR object 415, the projection and image capture device 110 may project a device-specific image 420 onto the IR object 115, such as one or more attacking spacecraft. The device-specific image 420 may be updated to conform to a static location of the IR object 415, such as the attacking spacecraft moving to fire weapons in the direction of the toy spaceship. The IR object may be moved by a hand 425 or by another object, and the device-specific image 420 may be updated according to the motion or the updated location of the IR object 415, such as updating the trajectory of a weapon projectile projected as being fired from the updated location of the toy spaceship.

Figure 5:
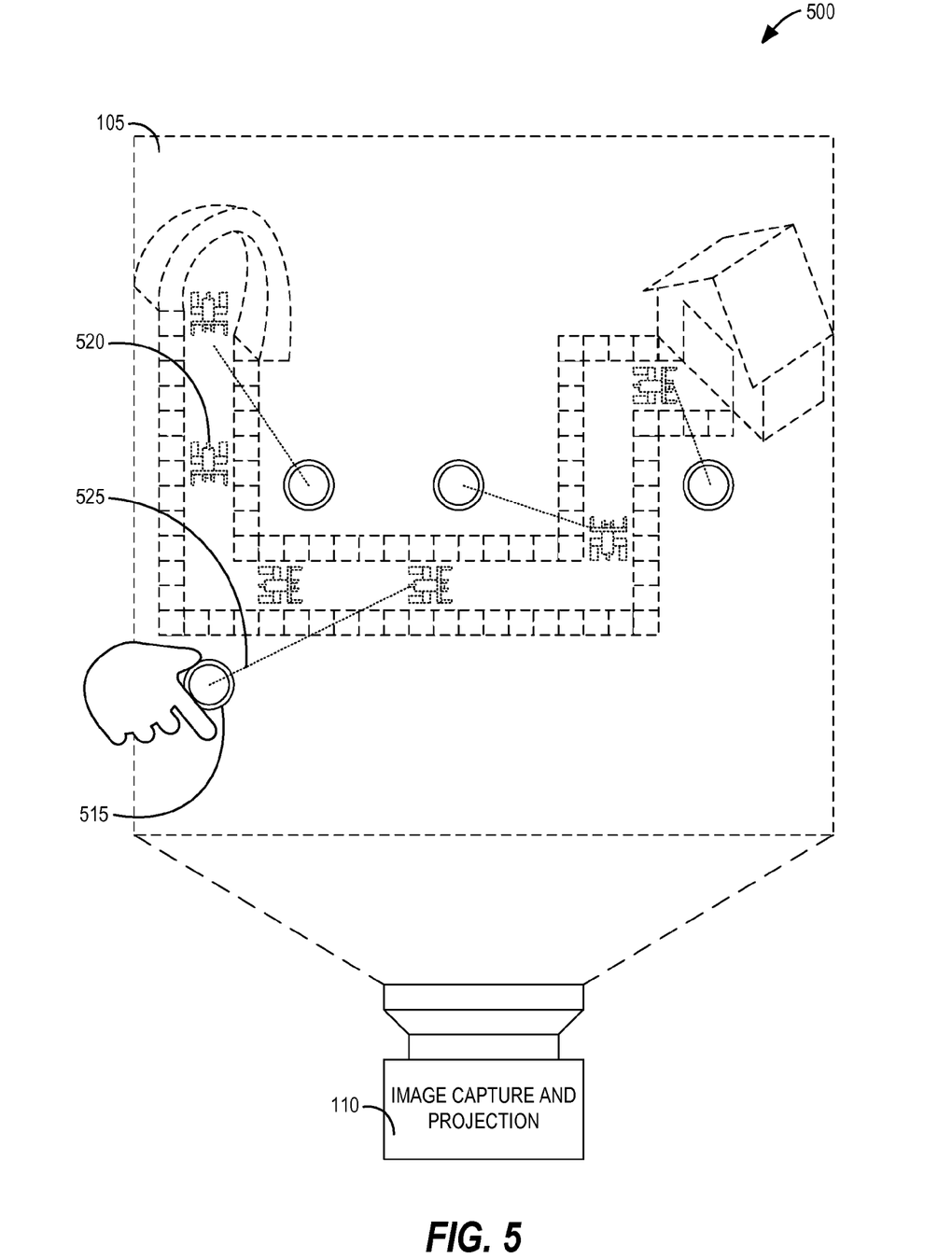
FIG. 5 is a representation of a multiple IR object location identification and interactive projected effect, according to an embodiment.

FIG. 5 is a representation of a multiple IR object location identification and interactive projected effect 500, according to an embodiment. The system may include a target surface 105, and a projection and image capture device 110 may capture and project images onto the target surface 105. The projection and image capture device 110 may capture an image of an IR object 515 on the target surface 105. For example, the IR-reflective object 515 may be a toy tower for use within a tower defense game, where the object of the game may be to place multiple towers to slow or stop the passage of one or more enemy characters 520 along a path projected onto the target surface 105. The IR-reflective object 515 may be formed from or coated with a material that reflects IR light. The IR object 515 may also generate an IR light or pattern, such as using an internal IR LED as a toy tower light. When the IR object 515 is placed within the target surface 105, the projection and image capture device 110 may identify the IR object 515. For example, different toy towers may provide unique features, including slowing or attacking nearby enemy characters 520. Based on identification of the IR object 515, the projection and image capture device 110 may project a device-specific image 525 onto the IR object 115, such as a projectile weapon aimed at the furthest enemy character within range of the toy tower. The IR object 515 may be an inactive object that changes the projected environment, such as a toy wall that changes the path of enemy characters. The projection and image capture device 110 may be used to detect the absence of an IR object 515. For example, a chess or checkers game may include multiple IR objects 515 that are removed as play progresses, or a turn-based board game may include IR-reflective play surfaces that may be covered by non-IR-reflective pieces. In other embodiments, the projection and image capture device 110 may capture an image from a playing surface and project an interactive environment onto another surface.

Figure 6:
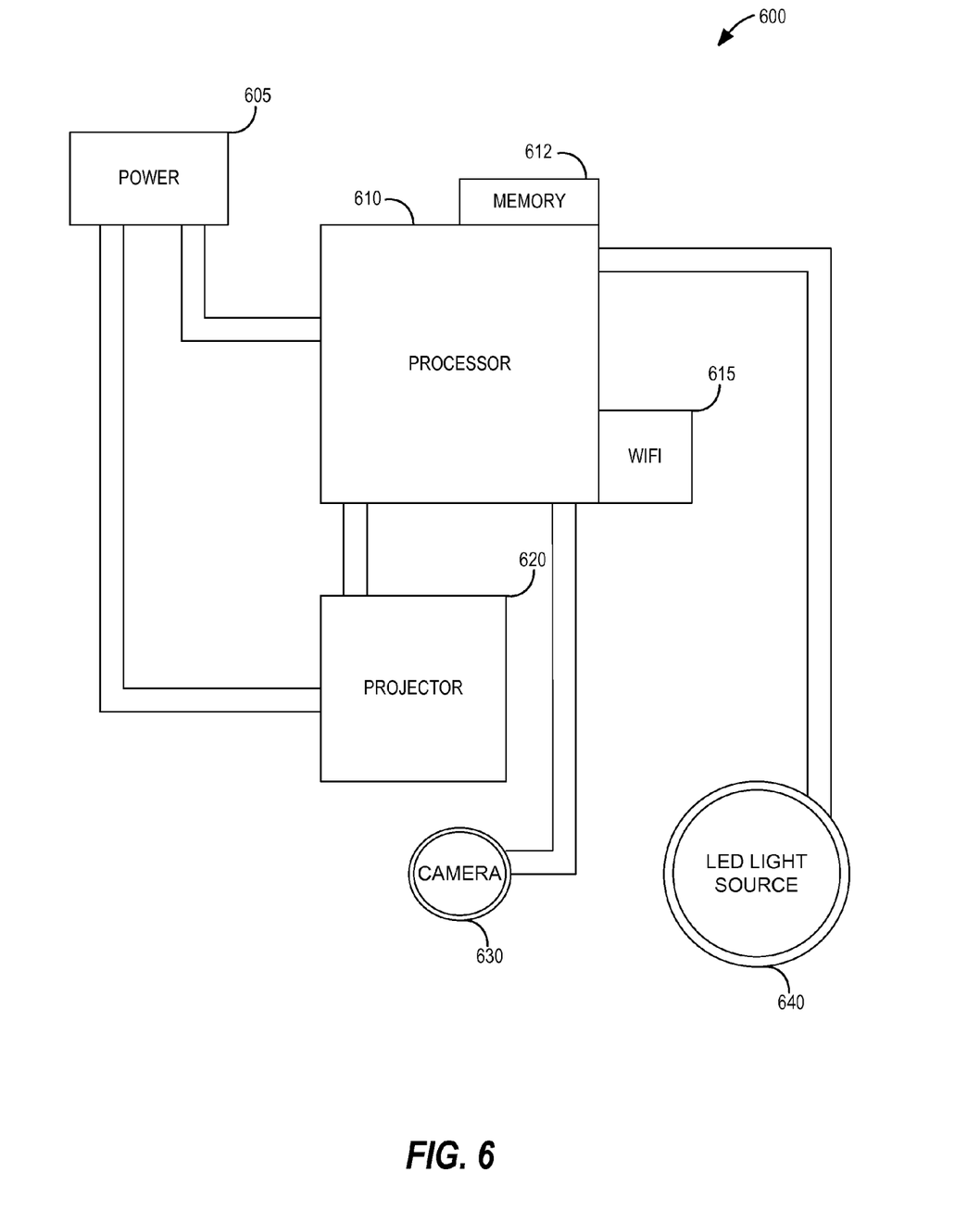
FIG. 6 is a block diagram of specific hardware components of an interactive projection effect and entertainment system, according to an embodiment.

FIG. 6 is a block diagram of general hardware components 600 of an interactive projection effect and entertainment system, according to an embodiment. The hardware components 600 may receive power from an internal or external power source, and may use a power inverter 605. In alternate embodiments, the hardware components 600 may include connectors to connect with and receive power from an electrical outlet, a battery power source, both a batter power source and an electrical outlet, and the like. The hardware components 600 may include a microcomputer processor 610, a projector 620, an image-capturing device 630, and a light source 640.

One or more peripheral or integrated wireless communication devices may be present in some embodiments and may be used in conjunction with the hardware components 600. For example, a peripheral Wi-Fi® or Bluetooth® adapter may be connected to the hardware components 600 through an external Universal Serial Bus (USB) port or other communication port. The microcomputer processor 610 may include an integrated wireless communication adapter 615, or a separate wireless communication adapter 615 may be attached directly to the microcomputer processor 610 or to a bus to which the microprocessor is also attached. The wireless communication devices may be used to connect the microcomputer processor 610 to the Internet or other network, or the wireless communication devices may be used as an input device to cause various actions to be executed by the microcomputer processor 610.

The image-capturing device 630 may be in the form of a camera arranged to capture video images of objects. The image-capturing device 630 may be a CMOS camera, which may be implemented on a CMOS integrated circuit (IC) mounted to a circuit board. The image-capturing device 630 may be a high-speed camera, and may be capable of capturing at least thirty frames per second (fps), sixty fps, or more. In further instances, the image-capturing device 630 may be arranged to capture video of any moving objects within a target area. In either instance, the video captured comprises a sequence of frames in which each frame is comprised of a two dimensional array of pixels.

The image-capturing device 630 may include a lens or an integrated or attached infrared (IR) filter. The image-capturing device 630 may include an IR light source, an IR light source may be included within the LED light source 640, or an IR light source may be connected as a peripheral device. The image-capturing device 630 may coordinate detection and projection of IR light between one or more internal or external wired or wireless IR light sources. The image-capturing device 630 may include an internal or external wired or wireless light sensor to identify or reduce ambient light noise. For example, image-capturing device 630 may communicate with a wireless IR light source and a wireless light sensor to generate multiple images suitable for HDR processing. The image-capturing device 630 may include one or more IR LEDs in an array, and may include one or more filters or diffusers to spread or focus IR light, such as to enable a uniform light field. For example, the light sensor may detect sufficient incident or ambient IR from lights or the sun such that internal IR lights are not needed.

The IR light source may project IR light into a target area or surrounding environment adjacent the output display area, for example in a grid or other pattern. The lens may capture the infrared light reflected back from objects in the target area such that interactive software (e.g., software such as provided by Po-Motion Interactive Software) can use the microcomputer processor 610 to analyze the captured array and define a shape of objects, in either a two-dimensional (2-D) or three-dimensional (3-D) manner, within the target environment by studying how the grid pattern of projected IR light is altered in its reflective state as captured by the lens. The interactive software may be implemented on the Android operating system, on iOS, QNX, or another operating system. The light source may produce ambient or directional IR light of a specific wavelength that will be captured by a lens that is filtered to allow only that wavelength of IR light to be detected by the camera. The lens may be arranged to capture video frames at a predetermined depth of field. The video frames may be comprised of pixels, and the predetermined depth of field may enable the microcomputer processor 610 to interpret each pixel as a distance on a projected interactive display. For example, the following configuration would result in one pixel per inch: the depth of field is selected so that only objects approximately ten feet away are in focus, the interactive display projects a ten foot square projection from a height of ten feet, and the captured image is one hundred and twenty pixels square.

The image-capturing device 630 may include one or more components that enable sensing of 3-D depth, motion, or presence of an object or person. Sensing 3-D depth, motion, or presence may be enabled by augmenting 2-D sensing with a depth sensor to capture motion perpendicular to the image-capturing device 630, such as with sonic or laser range detection. Sensing 3-D depth or motion may also be enabled using stereoscopic vision, such as by using two or more cameras within the image-capturing device 630. Sensing 3-D depth or motion may also be enabled using motion parallax, such as by moving a single camera to capture images from two different angles. Sensing 3-D depth or presence may allow the microcomputer processor 610 to determine when objects are covering a room's floor, such as might be used as a "messy meter" that prevents interactive device operation until the room floor has been cleaned. 3-D depth may also be used to track a child's height or other person's height to determine growth, or may be used to track level of movement to collect health and activity statistics. Sensing 3-D depth, motion, or presence may be used to enable accurate projection of images onto stationary or mobile surfaces, people, toys, or other objects, where the projection of images may be used, for example, to turn a white box into a spaceship, to project colors on people, or to project other interactive and transformative effects. Such modes of depth and motion detection, both 3-D and 2-D, may be used in some embodiments for automated calibration of the hardware components 600 and software that executes thereon.

The light source 640 may include an integrated infrared (IR) light source and an integrated ambient light source, or an integrated infrared (IR) light source or integrated ambient light source may be connected as a peripheral device. The ambient light source may include an LED light source, an incandescent light source, or another ambient light source. The light source 640 may include a dimmer feature for the integrated ambient light source, where the dimmer feature may accept a lower voltage or current and provide a reduced amount of ambient light. The IR light source may include an LED light source or a laser IR light source.

The microcomputer processor 610 may be a standalone processor, or may be a personal computer or laptop having a processor therein to be arranged to execute various algorithms stored on memory 612 in the form of software. Among the algorithms is a motion-detecting algorithm that receives the motion information from the image-capturing device 630 and compares adjacent frames of video in the sequence according to prescribed criteria. The frame comparison may determine where motion occurs within each frame, and may determine how much motion is occurring at any given time. The motion-detecting algorithm may be configured to detect motion for each frame relative to a previous frame in real time as the video is captured. In other embodiments, the motion detection algorithm may be configured to detect motion between every two frames, three frames, or other number of frames as may be desired or set according to a desired resolution of motion detection, as can be satisfactorily processed by available computing resources, and the like. In other embodiments, rather than throttling the motion detection algorithm to scale processing to available computing resources, a frame capture rate of the image capture device may be modified.

The microcomputer processor 610 may include or execute software of an image-generating algorithm that produces an interactive image to be displayed or projected on the output display area. More particularly, the image-generating algorithm may alter a graphical image being displayed in response to the motion detected within the video frames. The microcomputer processor 610 may generate the interactive projection component using interactive software installed on the microcomputer processor 610. The interactive software may receive input camera frames from the image-capturing device 630 and process the input camera frames to generate motion data. Conventional image processing (e.g., computer vision) can be processor-intensive and prone to errors. To improve reliability and processor efficiency, the interactive software may use IR image processing. When the hardware components 600 are in interactive mode, the light source 640 may use the integrated IR light source to wash the projection area with IR light. The IR light is invisible to the naked eye, but the IR light allows the image-capturing device 630 with integrated IR filter, or otherwise with IR sensing capability, to capture motion from users while ignoring other motion activity in the projection area. The image-capturing device 630 may use various combinations of hardware or software to capture and process different wavelengths of light. For example, a conventional CMOS camera may be used, where IR filters or visible light filters may be applied manually or mechanically. The image-capturing device 630 may include independent sensors for different wavelengths. For example, a CMOS or other sensor array may include an RGBIR sensor, where the RGBIR sensor may include interleaved sensors for visible red light, visible green light, visible blue light, and infrared light. IR motion data from the image-capturing device 630 may be used by the microcomputer processor 610 to track user position and motion. The motion data may be generated using a shape-detection algorithm. The shape-detection algorithm, in some embodiments, operates on changes from processed frame to processed frame using reflected IR light, and filters out any changes determined to be too small to represent an intentional motion by the user. The shape-detection algorithm provides information about the detected shapes to the interactive software. The interactive software interprets shape changes as motion, where the detected motion is processed to determine if the motion has triggered a "motion event."

In some embodiments, the microcomputer processor 610 may accept wireless signals from a remote control. The remote control may communicate via infrared (IR), Bluetooth®, Wi-Fi®, or other communication methods. The remote control may be a dedicated remote control, similar to a TV remote, or the remote control may be a computing device running a remote control application, such as a smartphone or tablet device having a remote control app that executes thereon. Using the remote control, a user may turn the interactive projection effect and entertainment system of the hardware components 600 on or off, and may select between an interactive projection and a conventional light. The remote control may also select among available games, streaming internet channels, interactive effects, input sources (i.e., AV, HDMI, TV, digital TV, cable, digital cable, RGB, etc.) similar to switching through channels on a TV. As such, the hardware components 600 may also include one or more additional video inputs to enable connectivity with video sources, such as cable television, over-the-air television signals, set-top boxes, video playing devices, computers, and the like.

In some embodiments, the microcomputer processor 610 may execute interactive content (e.g, entertainment content), such as one or more stored games, streaming media services (e.g., Netflix®, ChromeCast®), or interactive effects. This entertainment content may be installed on the memory 612 associated with the microcomputer processor 610, such as on a hard drive, removeably memory card (e.g., micro SD card, USB drive), random-access memory, other type of memory storage, or streamed from a video source input such as HDMI®. The microcomputer processor 610 may also access the entertainment content through an application store. The application store may offer entertainment content for no cost, for a time-limited rental, for purchase, or through other contractual arrangements. The application store may be executed by the microcomputer processor 610, or may be executed on a separate computing device. For example, additional entertainment content may be downloaded and managed from a website using a user's phone or laptop, and may be transferred to the memory 612 via a wired connection or wirelessly via the Wi-Fi® adapter 615. In another embodiment, purchased entertainment content may be stored on the internet (e.g., the "cloud"), and can be transferred to the microcomputer processor 610 on an on-demand basis. Although referred to as entertainment content, the entertainment content may instead be educational, informative, instructional, exemplary, and other forms of content.

The microcomputer processor 610 may interact with a graphical user interface displayed on a controller display area. The controller display area may be provided in the form of an auxiliary display separate from the primary display locating the output display area thereon. For example, the graphical user interface may be provided on the remote control, on a smartphone, on a computer, or on another device. The graphical user interface permits interaction with an operator of the system through a user input, where the user input is typically in the form of input controls on a computing device (i.e., keyboard, mouse, touchpad, touchscreen, microphone, video capture device, etc.). The graphical user interface allows the various criteria of the motion-detecting algorithm to be visually represented on the graphical user interface display area such that the user can readily adjust the criteria through the user input. The graphical user interface may also allow the user to adjust the sensitivity of the interactive video system to motion for calibrating the system to the surrounding environment. However, in other embodiments, the user interface may be presented by the hardware components as a projection from the projector 620 with which a user may interact and the user interactions captured by the image-capturing device 630 and motion detecting algorithm. The user interface may include selectable icons and menu items, a projected keyboard, and the like.

The microcomputer processor 610 may include a calibration function to calibrate the interactive projection with the image-capturing device 630. Calibration may correct or compensate for distortion or discontinuity caused by projecting entertainment content onto a surface that is not perpendicular to the projector 620 or image-capturing device 630. Once calibrated, the microcomputer processor 610 may correctly process motion on the screen by identifying any area where movement is taking place and converting it to a "touch event," similar to how screen interactivity is achieved on a touchscreen. Calibration may be accomplished by aligning pattern or motion data from the image-capturing device 630 one or more objects or assets in the projection screen area. Calibration may be performed automatically by using a projected and captured pattern, or may be performed manually through a series of prompted user input events. For example, manual calibration may be accomplished by causing the projector 620 to project one or more calibration points, waiting for the user to touch each calibration point, and using the image-capturing device 630 to record the user motion.

Once calibrated, the microcomputer processor 610 may cause the projector 620 to project an interactive environment. Various interactive environments may include educational environments for home or school. An application may include an interactive play mat for babies, where motion from the projection on the floor stimulates babies and encourages them to move and crawl. An application may include a physically engaging game for one or more children, encouraging children to jump, run, dance, move in order to trigger effects (e.g., make flowers bloom), or win a game (e.g., play soccer, Greedy Greedy Gators, and even interactive versions of well-known, branded games). An application may include a room decoration to help theme an environment (e.g., a front lobby installation). An application may include a resource for children with sensory, motor, or social difficulties, where the interactive responses from the floor may encourage children to explore different types of motion. Other applications may be marketing-oriented, such as an application that causes images of wall colors or pieces of furniture to be projected into an environment to allow a consumer a preview of how the wall color may look or how a piece of furniture may fit or look within the environment, and as may be modified based on color, upholstery, and other options of a piece of furniture. In some embodiments, the calibration functions described above and the 2-D and 3-D motion sensing algorithms may provide data to such a furniture previewing application to facilitate a properly scaled 2-D projection of a piece of furniture to be projected Various interactive environments may include games for home or school. Motion events in gameplay can be used in various games. A motion event may include a user limb movement that may be interpreted as kicking a ball or hockey puck around to score goals against an opponent. A motion event may include jumping, where the jumping event causes an animation to occur or react in a different way. A motion event may include running, where the running may trigger lighting effects. A motion event may include waving, where the waving may be used to herd or corral animals.

The hardware components 600 may include a motorized mount. The motorized mount may be a moveable mirror configured to redirect the light from the projected interactive environment, or may be a mechanism that reorients the projector 620 or one or more of the other hardware components 600. The motorized mount may be used to display a movie or interactive game on a wall, ceiling, or floor. The motorized mount may be used within a video conference to redirect the projector 620 or the image-capturing device 630. The motorized mount may be used to display and interact with the interactive environment using one or many physical objects, such as using a toy to interact with an animated character. The motorized mount may be used to generate a 3-D map of objects, such as by orienting the projector 620 and image-capturing device 630 at furniture, people, or other objects within a room. The motorized mount may also be used to reorient the projected interactive environment to the ceiling, such as for ambience, relaxation, comforting nightlight, or constellation simulations.

The hardware components 600 may also include one or both of one or more speakers and one or more microphones. The speakers may be used to project sound effects, music, web conference or video call audio, or an audio notification such as an alarm. When the user is using a multiplayer interactive environment, the speakers may project sounds from remote players. The microphones may be used to provide voice commands or voice recognition. The speakers and microphones may be used together to provide audio interaction, such as in videoconferencing or audibly interacting with an animated character.

Example 1 includes a method of providing a virtual environment, the method comprising detecting a first ambient infra-red (IR) light level, projecting a first IR light pattern onto an IR object, the first IR light pattern having an associated first intensity level selected according to the detected first ambient IR light level, capturing a first IR image, the first IR image including the IR object, and identifying the IR object within the first IR image.

Example 2 includes the method of example 1, the method further including detecting a second ambient IR light level, comparing the detected second ambient IR light level with the detected first ambient IR light level, the second ambient IR light level being different from the first ambient IR light level, and projecting a second IR light pattern onto an IR object, the second IR light pattern having an associated second intensity level selected according to the comparing of the first and second detected ambient IR light levels.

Example 3 includes the method of example 1, the method further including generating a first graphical image in response to identifying the IR object, and projecting the first graphical image onto a surface.

Example 4 includes the method of any of examples 1-3, the method further including capturing a second IR image, the second IR image being different from the first IR image, comparing the first IR image to the second IR image, the comparison identifying an updated location of the IR object, generating a second graphical image in response to the identifying, and projecting the second graphical image onto a surface.

Example 5 includes a method of providing a virtual environment, the method comprising capturing a first IR image and a second IR image, the first IR image being different from the second IR image, comparing the first IR image to the second IR image, the comparison identifying movement of any IR object present in both images and introduction of an IR object in the second image, generating a graphical image in response to the identifying, and projecting the graphical image onto a surface.

Example 6 includes the method example 5, further including projecting an IR light onto the IR object.

Example 7 includes the method of any of examples 5-6, wherein projecting the IR light onto the IR object includes projecting an IR pattern.

Example 8 includes the method of any of examples 5-6, further including detecting an IR object signature reflected by the IR object.

Example 9 includes the method of example 5, further including detecting an IR object signature generated by the IR object.

Example 10 includes the method of example 5, wherein identifying the IR image of an IR object includes identifying a motion of the IR object.

Example 11 includes the method of any of examples 5-10, wherein updating the graphical image includes updating an object within the graphical image in response to the motion of the IR object.

Example 12 includes the method of any of examples 5-10, further including predicting a future motion of the IR object.

Example 13 includes the method of example 5, wherein updating the graphical image includes adding an object-specific graphical component in response to identifying the IR image of the IR object, and projecting the graphical image onto the surface includes projecting the object-specific graphical component onto the IR object.

Example 14 includes the method of any of examples 5-13, wherein projecting the object-specific graphical component onto the IR object includes adding an appearance of an object to the appearance of the IR object.

Example 15 includes an infrared reflective device interactive projection effect system, the system comprising an ambient IR light level detector, an IR pattern projector configured to vary a projected IR pattern according to an ambient IR light level detected by the ambient IR light level detector, an IR image sensor configured to capture a first IR image, the first IR image including a IR object, and a visible light projector configured to project a first graphical image in response to the captured first IR image.

Example 16 includes the system of example 15, wherein the visible light projector changes the appearance of the IR object by projecting the first graphical image onto the IR object.

Example 17 includes the system of example 15, further including a processor configured to identify the IR object within the first IR image, and generate the first graphical image in response to identifying the IR object.

Example 18 includes the system of any of examples 15-17, wherein the IR image sensor is further configured to capture a second IR image, the second IR image being different from the first IR image, and the processor is further configured to compare the first IR image to the second IR image, the comparison identifying an updated location of the IR object, generate a second graphical image in response to identifying the updated location, and cause the visible light projector to project the second graphical image.

Example 19 includes the system of any of examples 15-18, wherein the first graphical image includes a projected object in a first projected object location, the second graphical image includes a projected object in a second projected object location, the second projected object location being different from the first projected object location, and the visible light projector is configured to project the second graphical image after projecting the first graphical image to provide an appearance of motion of the projected object.

Example 20 includes the system of any of examples 15-18, wherein the processor is further configured to identify, using the updated location of the IR object, a predicted motion of the IR object, and generate a third graphical image in response to identifying the predicted motion, and cause the visible light projector to project the third graphical image.

Since various modifications can be made to the various embodiments as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. A method of providing a virtual environment, the method comprising:
   detecting a first ambient infra-red (IR) light level;
   projecting a first IR light pattern onto an upper side of a target surface and onto an IR object positioned above the upper side of the target surface, the first IR light pattern having an associated first intensity level selected according to the detected first ambient IR light level;
   capturing a first IR image, the first IR image including the IR object and at least a portion of the upper side of the target surface; and
   identifying the IR object and identifying an IR object location within the first IR image;
   generating an animated graphical effect based on the IR object identification and the IR object location; and
   projecting the animated graphical effect onto the upper side of the target surface.

2. The method of claim 1, the method further including:
   detecting a second ambient IR light level;
   comparing the detected second ambient IR light level with the detected first ambient IR light level, the second ambient IR light level being different from the first ambient IR light level; and
   projecting a second IR light pattern onto the IR object, the second IR light pattern having an associated second intensity level selected according to the comparing of the first and second detected ambient IR light levels.

3. The method of claim 1, the method further including:
   identifying a non-IR object and non-IR object location within the captured first IR image;
   wherein generating the animated graphical effect is further based on identifying the non-IR object and the non-IR object location; and
   wherein projecting the animated graphical effect onto the upper side of the target surface includes projecting the animated graphical effect onto the non-IR object to interact with the non-IR object.

4. The method of claim 1, the method further including:
capturing a second IR image, the second IR image being different from the first IR image;
comparing the first IR image to the second IR image, the comparison identifying an IR object motion and an updated location of the IR object;
generating a second animated graphical effect in response to the comparison; and
projecting the second animated graphical effect onto the upper side of the target surface, the second animated graphical effect providing a displayed motion effect adjacent to the IR object to interact with the IR object.

5. A method of providing a virtual environment, the method comprising:
capturing a first IR image and a second IR image of an upper side of a target surface, the first IR image being different from the second IR image;
comparing the first IR image to the second IR image, the comparison identifying movement of a persistent IR object present in both images and introduction of an introduced IR object in the second image;
generating an animated graphical effect in response to the comparison; and
projecting the animated graphical effect onto the upper side of the target surface, the animated graphical effect providing a displayed motion effect adjacent to the IR object.

6. The method of claim 5, further including projecting an IR light onto the upper side of the target surface and onto the IR object.

7. The method of claim 6, wherein projecting the IR light onto the IR object includes projecting an IR pattern.

8. The method of claim 6, further including detecting an IR object signature reflected by the IR object.

9. The method of claim 5, further including detecting an IR object signature generated by the IR object.

10. The method of claim 5, wherein identifying the IR image of an IR object includes identifying a motion of the IR object.

11. The method of claim 10, wherein updating the animated graphical effect includes updating a location of a virtual object within the animated graphical effect in response to the motion of the IR object.

12. The method of claim 10, further including predicting a future motion of the IR object.

13. The method of claim 5, wherein:
updating the animated graphical effect includes adding an object-specific graphical component in response to identifying the IR image of the IR object; and
projecting the animated graphical effect onto the upper side of the target surface includes projecting the object-specific graphical component onto the IR object.

14. The method of claim 13, wherein projecting the object-specific graphical component onto the IR object includes adding an appearance of an object to the the IR object.

15. An infrared reflective device interactive projection effect system, the system comprising:
an ambient IR light level detector;
an IR pattern projector configured to vary a projected IR pattern according to an ambient IR light level detected by the ambient IR light level detector;
an IR image sensor configured to capture a first IR image, the first IR image including a IR object positioned above an upper side of a target surface and including at least a portion of the upper side of the target surface;
a processor configured to:
identify the IR object and an IR object location within the first IR image; and
generate a first animated graphical effect based on identifying the IR object and the IR object location; and
a visible light projector configured to project the first animated graphical effect onto the upper side of the target surface in response to the captured first IR image.

16. The system of claim 15, wherein the visible light projector changes the appearance of the IR object by projecting the first animated graphical effect onto the IR object.

17. The system of claim 15, the processor further configured to:
identify a non-IR object and non-IR object location within the first IR image; and
generate the first animated graphical effect based on identifying the non-IR object and the non-IR object location.

18. The system of claim 17, wherein:
the IR image sensor is further configured to capture a second IR image, the second IR image being different from the first IR image, the second IR image including the IR object and at least a portion of the upper side of the target surface;
the processor is further configured to:
compare the first IR image to the second IR image, the comparison identifying an IR object motion and an updated location of the IR object; and
generate a second animated graphical effect in response to the comparison; and
the visible light projector is further configured to project the second animated graphical effect onto the upper side of the target surface, the second animated graphical effect providing a displayed motion effect adjacent to the IR object to interact with the IR object.

19. The system of claim 18, wherein:
the second animated graphical effect includes a projected object in a first projected object location;
the second animated graphical effect includes a projected object in a second projected object location, the second projected object location being different from the first projected object location; and
the visible light projector is configured to project the second animated graphical effect after projecting the first animated graphical effect to provide an appearance of motion of the projected object.

20. The system of claim 18, wherein the processor is further configured to:
identify, using the updated location of the IR object, a predicted motion of the IR object; and
generate a third animated graphical effect in response to identifying the predicted motion; and
cause the visible light projector to project the third animated graphical effect.

* * * * *